(12) United States Patent
Botte

(10) Patent No.: US 7,101,468 B1
(45) Date of Patent: Sep. 5, 2006

(54) END BOX OF AN ELECTRODIALYSER, ELECTRODIALYSER COMPRISING SAME AND ELECTRODIALYSIS METHOD

(75) Inventor: Luc Botte, Rosignano-Solvay (IT)

(73) Assignee: Solvay, Brussels (BE)

( * ) Notice: Subject to any disclaimer, the term of this patent is extended or adjusted under 35 U.S.C. 154(b) by 146 days.

(21) Appl. No.: 10/129,621

(22) PCT Filed: Nov. 8, 2000

(86) PCT No.: PCT/EP00/11036

§ 371 (c)(1),
(2), (4) Date: Sep. 16, 2002

(87) PCT Pub. No.: WO01/34282

PCT Pub. Date: May 17, 2001

(30) Foreign Application Priority Data

Nov. 11, 1999 (IT) .............................. MI99A2358

(51) Int. Cl.
*B01D 61/46* (2006.01)

(52) U.S. Cl. .................. 204/636; 204/638; 204/639

(58) Field of Classification Search ............... 204/529, 204/636, 638, 639
See application file for complete search history.

(56) References Cited

U.S. PATENT DOCUMENTS

| | | | |
|---|---|---|---|
| 4,673,479 A | 6/1987 | Morris et al. | |
| 5,013,418 A | 5/1991 | Wüllenweber et al. | |
| 5,637,204 A * | 6/1997 | Botte | 204/627 |
| 5,681,438 A * | 10/1997 | Proulx | 204/627 |
| 5,972,191 A * | 10/1999 | Mani | 204/631 |
| 6,274,020 B1 * | 8/2001 | Schmidt et al. | 204/636 |

FOREIGN PATENT DOCUMENTS

EP 0 081 092 A1 6/1983

* cited by examiner

Primary Examiner—Arun S. Phasge
(74) Attorney, Agent, or Firm—Stites & Harbison PLLC; Ross F. Hunt, Jr.

(57) ABSTRACT

Electrodialysis device endbox comprising a vertical electrode (7) and a selectively ion-permeable membrane (10) which is arranged vertically, facing the electrode, and separated from the latter by a vertical passage (19)

Electrodialysis device comprising an alternation of selectively ion permeable vertical membranes (1, 2, 3) and dividers (4) between two endboxes (5), at least one of which is as defined hereinabove.

5 Claims, 2 Drawing Sheets

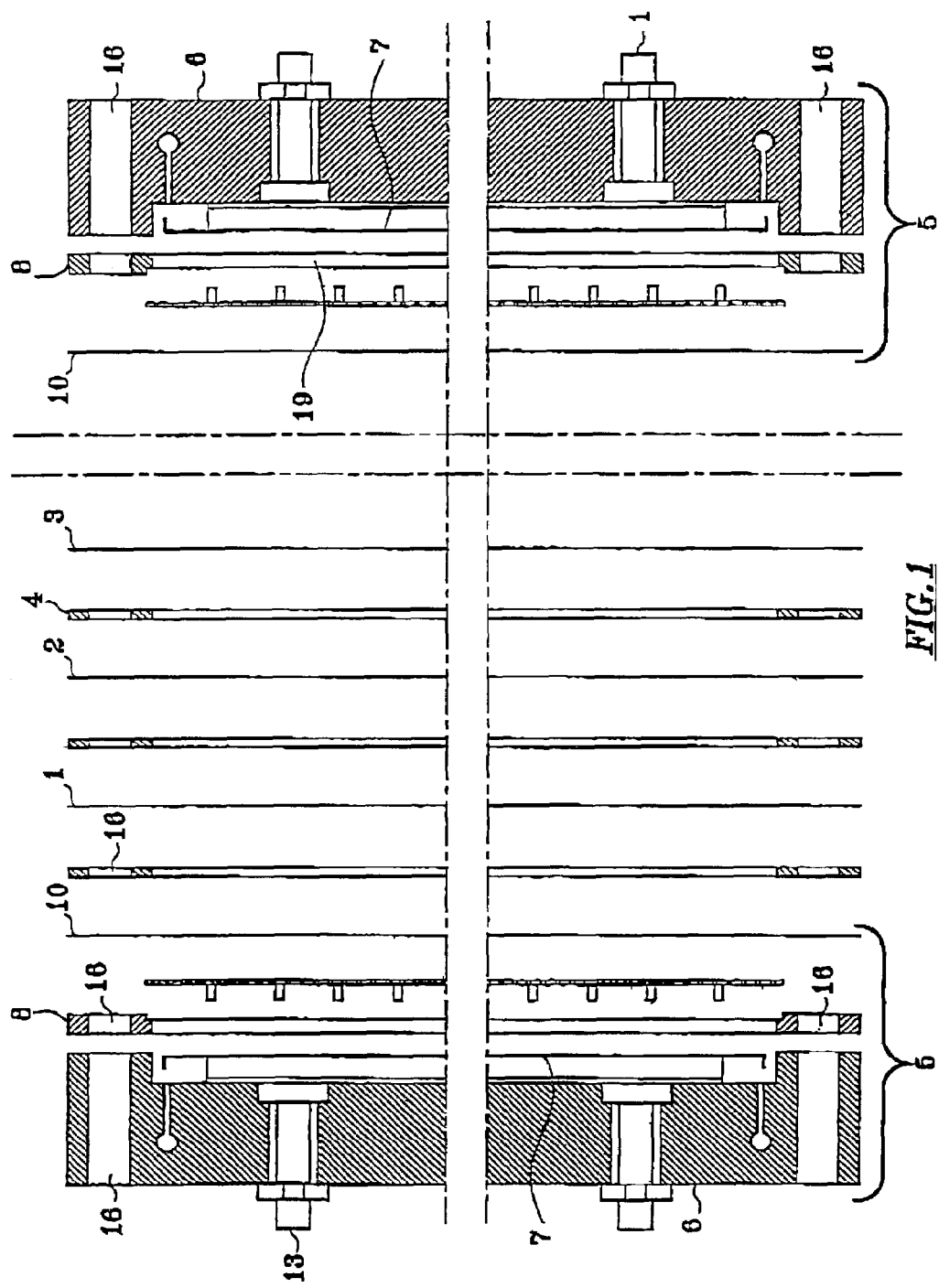

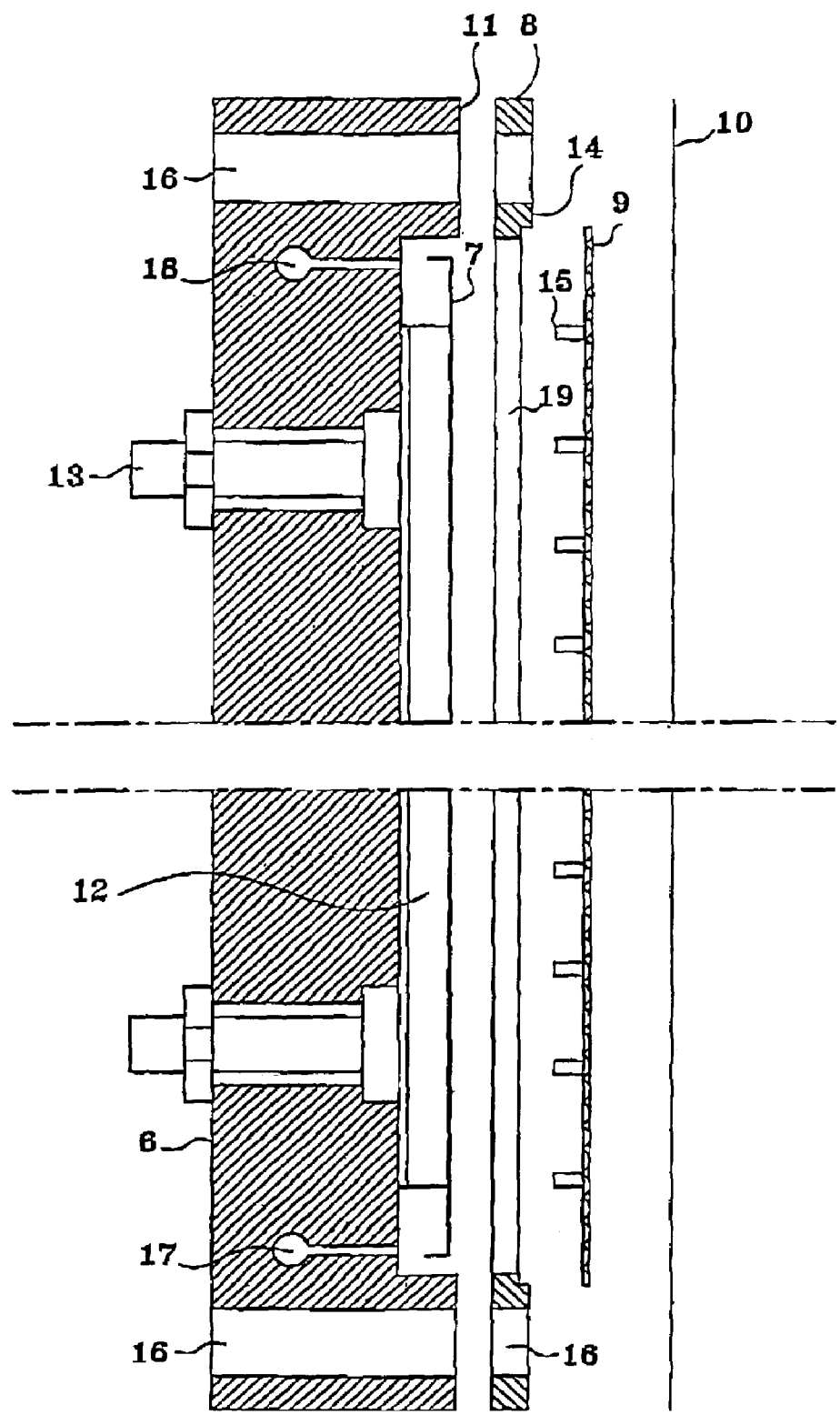

END BOX OF AN ELECTRODIALYSER, ELECTRODIALYSER COMPRISING SAME AND ELECTRODIALYSIS METHOD

The invention relates to electrodialysis devices.

It relates more particularly to the boxes arranged at the ends of the electrodialysis devices and comprising electrodes.

Electrodialysis devices are electrochemical installations formed of a stack of selectively ion-permeable membranes and of dividing frames between two endboxes containing electrodes. The endboxes normally comprise a chamber and, therein, a vertical electrode and a selectively ion-permeable membrane, arranged vertically, facing the electrode. The schematic depiction of an electrodialysis device features in "Techniques de l'ingénieur [Engineering Techniques]" 3-1988, page J2840-13, FIG. 18. While the electrodialysis device is in operation, the electrodes are connected to the terminals of a DC current source and electrolytes are introduced into the compartments defined between the membranes, and into the two endboxes, so as to generate electrochemical reactions within the electrolytes.

The electrochemical reactions which take place in the endboxes generally generate a gas on the electrodes, for example oxygen and hydrogen in the case of aqueous electrolytes. It is important that these gases be removed regularly, this removal habitually being achieved by causing the electrolyte to circulate in the loop between the endbox and a degassing chamber (EP-A-0081092, page 8, lines 11 to 16). The use of perforated metal sheet for the electrodes has also been proposed, with a chamber being formed behind the sheet, for circulation of the electrolyte and the gas [EP-A-0724904 (SOLVAY)].

When electrodialysis devices are in operation, it is commonly found that the electric current density is distributed heterogeneously across the membranes, such that it is higher in the lower part of the membranes and decreases from the bottom thereof upwards. This phenomenon relates in particular to the membranes closest to the endboxes, especially the membrane contiguous with that of an endbox. This disturbs the operation of the electrodialysis devices.

The invention sets out to remedy this drawback of the known electrodialysis devices by providing an endbox of novel design and which, all other things being equal, greatly improves the homogeneity of the electric current density in the electrodialysis devices.

In consequence, the invention relates to an electrodialysis device endbox comprising a vertical electrode and a selectively ion-permeable membrane which is arranged vertically, facing the electrode, said endbox being characterized in that a vertical passage separates the electrode from the membrane.

The electrode of the box according to the invention needs to be made of an electrically conducting material that is also compatible with the desired electrode reaction. Its structure is not critical. It advantageously comprises a metal sheet. The metal sheet may, for example, comprise a solid sheet, a perforated sheet, a sheet of expanded metal, an open-work plate or a lattice. The electrode is roughly vertical.

A "selectively ion-permeable membrane" is to be understood as meaning a thin film which is practically impermeable to aqueous electrolytes but permeable to certain ions. The selectively ion-permeable membrane may be a selectively anion-permeable membrane or a selectively cation-permeable membrane.

In the box according to the invention, the electrode and the membrane are normally arranged in a chamber delimited by an appropriate chassis the shape and structure of which are not critical to the invention. Information regarding the chassis is accessible in particular in "Techniques de l'ingénieur [Engineering Techniques]" 3-1988, page J2840-13, FIG. 18 and EP-A-0724904 (SOLVAY).

According to the invention, the electrode and the membrane are separated by a vertical passage. This passage extends over the entire height of the electrode and the membrane and, advantageously, over practically the entire length of the electrode and of the membrane. The passage is intended to allow the electrolyte and the gas generated on the electrode to flow upwards during normal electrodialysis operation. The width of the passage (its dimension transversely to the membrane and to the electrode) has to be large enough for the aforementioned flow of the electrolyte and of the gas to be practically unimpeded. The optimum width depends on various parameters, particularly on the dimensions of the electrode (mainly its height), on the electric current density and on the electrolyte used in the box. It has therefore to be determined for each specific instance through routine laboratory work. In practice, when the electrode is a sheet, it is recommended that the width of the passage be greater than 0.002 times the height of the sheet, the ratio between the width of the passage and the height of the sheet preferably being between 1:200 and 1:50.

In the box according to the invention, any appropriate means may be used to form the passage. In a preferred embodiment of the invention, the passage is delimited between the electrode and a perforated vertical plate which supports the membrane and which is kept away from the electrode by spacer pieces. In this embodiment of the invention, the spacer pieces need to be designed so that they do not impede the upwards flow of the electrolyte and of the gas through the passage, while the box is in operation. To this end, they may for example comprise narrow vertical strips which are fixed by their end faces to the electrode and to the plate.

In the embodiment of the invention which has just been described it is appropriate to avoid the plate being the site of a release of gas while the box is in use in an electrodialysis device. This objective is achieved using various means. According to a first means, the plate is made of an inert material that does not conduct electricity. According to a second means, the plate is made of an electrically conducting material, which in order to evolve the gas produced at the electrode would have to be raised to a higher potential than the electrode. According to a third means, which is preferred, the plate is made of an electrically conducting material, and the insert which connects it to the electrode is made of a material which does not conduct electricity.

The invention also relates to an electrodialysis device comprising, in a way known per se, an alternation of vertical selectively ion-permeable membranes and of dividers, between two endboxes, at least one of which is in accordance with the invention.

In the electrodialysis device according to the invention, the selectively ion-permeable membranes which are situated between the two boxes may comprise selectively anion-permeable membranes, selectively cation-permeable membranes and bipolar membranes.

In the electrodialysis device according to the invention, the selectively ion-permeable membranes and the dividers inserted between them define electrodialysis compartments which are in communication with electrolyte inlet ducts and electrolyte outlet ducts. In practice, to form these compartments, the dividers are frames applied to the peripheral region of the membranes. The number of electrodialysis compartments is not critical. It normally exceeds ten and may habitually be as many as several hundred, between the two endboxes.

The electrodialysis device according to the invention finds various applications which are well known in the art of electrodialysis. It is particularly suited to electrodialysis methods employing, within the electrodialysis device, an electric current density of less than 3 kA/m$^2$ and which preferably does not exceed 2.5 kA/m$^2$.

The invention therefore also relates to an electrodialysis method whereby use is made of an electrodialysis device according to the invention, and whereby the electric current density used in the said electrodialysis device is less than 3 kA/m$^2$. In the method according to the invention, a current density which does not exceed 2.5 kA/m$^2$ is preferably selected, the values from 0.1 to 2.0 kA/m$^2$ being particularly advantageous, and those from 0.5 to 1.5 kA/m$^2$ being preferred.

In the method according to the invention, the electric current density is expressed with respect to the surface area of one face of the membrane of the electrodialysis device endbox. When the membranes of the two endboxes do not have the sane surface area, the current density is expressed with respect to the membrane with the smallest surface area.

The method according to the invention finds a particularly advantageous use in the electrodialysis of aqueous solutions of sodium salts such as sodium chloride, sodium carbonate, sodium phosphate or sodium sulphate. It is particularly suited to the manufacture of aqueous solutions of sodium hydroxide through electrodialysis of aqueous solutions of sodium chloride or of sodium carbonate.

Specifics and details of the invention will become apparent from the following description of the appended drawings.

FIG. 1 is an exploded view in longitudinal vertical section of one particular embodiment of the electrodialysis device according to the invention;

FIG. 2 is a view similar to FIG. 1, of an endbox of the electrodialysis device of FIG. 1.

In these figures, the same reference notation is used to denote elements which are identical.

The electrodialysis device depicted in FIG. 1 comprises, in a way known per se, selectively ion-permeable membranes 1, 2, 3, arranged vertically and alternating with vertical dividers 4, between two endboxes. Each endbox is denoted in its entirety by the reference numeral 5. The dividers 4 are thin frames delimiting electrodialysis compartments 7 between the membranes 1, 2 and 3.

FIG. 2 shows an endbox 5 on a larger scale. In accordance with the invention, the endbox 5 comprises a rectangular vertical plate 6, an electrode 7, a frame 8, a vertical plate 9 of expanded metal and a selectively ion-permeable membrane 10 (for example a selectively cation-permeable membrane). Facing the frame 8, the plate 6 has a protruding peripheral rim 11. The plate 6 and its rim 11 delimit a vertical cavity in which the electrode 7 is housed. This electrode comprises a vertical metal sheet, arranged roughly in line with the free face of the rim 11. The sheet 7 is welded to vertical metal longitudinal membranes 12 which are themselves welded to horizontal cylindrical bars 13 passing through the plate 6. The bars 13 are intended to be connected to a DC current source, not depicted.

The vertical frame 8 is applied to the rim 11 of the plate 6 and bears the expanded metal plate 9. The plate 9 is smaller than the frame 8 and is set back from an overhanging peripheral rim 14. Cylindrical tenons 15, the length of which is roughly equal to the thickness of the frame 8, are fixed to the plate 9. The tenons 15 are made of a material that does not conduct electricity, for example polytetrafluoroethylene. They serve to keep the plate 9 away from the sheet 7. Their length is roughly equal to the thickness of the frame 8, less the thickness of the plate 9. It is, for example, about 10 mm. The membrane 10 is pressed against the plate 9 and, at its periphery, against the rim 14 of the frame 8. A vertical passage 19 is thus formed in the box 5, between the electrode 7 and the membrane 10.

The plate 6, the frame 8, the frames 4 and the membranes 10, 1, 2 and 3 are pierced with through-openings 16 (not visible on the membranes) which are aligned so as to form ducts through which electrolytes can circulate while the electrodialysis device is in use.

In the endbox 5, the plate 6 and its rim 11, the frame 8 and the membrane 10 between them delimit an electrolysis chamber containing the electrode 7. The electrode 7 is an anode in one of the boxes 5 and a cathode in the other box. Ducts 17 and 18, formed in the plate 6, serve to let an electrolyte into the electrolysis chamber and to remove the products of the electrolysis.

While the electrodialysis device of FIGS. 1 and 2 is in operation, electrolytes are circulated through the compartments delimited between the membranes 1, 2, 3 etc. via the ducts 16. The bars 13 of the electrodes 7 are connected to the terminals of a DC current source and an electrolyte (for example an aqueous solution of sodium hydroxide) is introduced into the two endboxes 5, via the ducts 17. The electrolyte is broken down upon contact with the electrodes 7, with the release of a gas (generally oxygen at the anode and hydrogen at the cathode). The gas rises up inside the passage 19, taking the broken-down electrode with it, and escapes with it through the duct 18.

In one especially advantageous embodiment of the electrodialysis device depicted in the figures, membrane 1 is a bipolar membrane, membrane 2 is a selectively cation-permeable membrane and membrane 3 is a selectively anion-permeable membrane. These three membranes as a whole constituent an elementary electrodialysis cell or module repeated several times over (for example about hundred times) between the two boxes 5. The electrodialysis device according to this embodiment of the invention finds an application in the manufacture of an aqueous solution of sodium hydroxide starting from an aqueous solution of sodium chloride.

The invention claimed is:

1. Electrodialysis device endbox comprising an assembly comprising a vertical electrode and a selectively ion-permeable membrane which is arranged vertically, facing the electrode, wherein a vertical passage separates the electrode from the membrane, the electrode comprising a vertical sheet and the passage being delimited between the sheet and a perforated vertical metal plate which supports the membrane and which is electrically insulated from the sheet, said assembly including spacing means for insulatingly spacing the sheet and the plate from each other to form the passage and the passage having a width exceeding 0.002 times the height of the sheet.

2. Endbox according to claim 1, wherein the ratio between the width of the passage and the height of the sheet is between 1:200 and 1:50.

3. Endbox according to claim 1, wherein the membrane is selectively permeable to cations.

4. Electrodialysis device comprising an alternation of vertical selectively ion-permeable membranes and of dividers, between two endboxes, wherein at least one of the endboxes is in accordance with claim 1.

5. Electrodialysis device according to claim 4, comprising a bipolar membrane.

* * * * *